US006469689B1

(12) United States Patent
Dow et al.

(10) Patent No.: US 6,469,689 B1
(45) Date of Patent: Oct. 22, 2002

(54) APPLIANCE AND METHOD OF USING SAME HAVING A CAPABILITY TO GRAPHICALLY ASSOCIATE AND DISASSOCIATE DATA WITH AND FROM ONE ANOTHER

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,789

(22) Filed: Aug. 7, 1998

(51) Int. Cl.[7] .................................................. G09G 5/00
(52) U.S. Cl. ...................................................... 345/156
(58) Field of Search ................................. 345/156–157, 345/169, 838; 382/213, 313; 358/473, 909.1, 906; 235/462; 348/333.05, 333.12, 552, 231; 386/117, 52

(56) References Cited

U.S. PATENT DOCUMENTS

| 4,701,804 A | * | 10/1987 | Toyoda et al. ............... 358/280 |
| 5,023,438 A | * | 6/1991 | Wakatsuki et al. ........... 235/472 |
| 5,511,148 A | * | 4/1996 | Wellner ....................... 395/106 |
| 5,526,011 A | * | 6/1996 | Hix et al. ..................... 345/87 |
| 5,550,938 A | * | 8/1996 | Hayakawa et al. .......... 382/313 |
| 5,587,928 A | * | 12/1996 | Jones et al. .................. 364/514 |
| 5,598,487 A | * | 1/1997 | Hacker et al. ............... 382/313 |
| 5,689,648 A | * | 11/1997 | Diaz et al. ................... 395/226 |
| 5,708,840 A | * | 1/1998 | Kikinis et al. ............... 395/800 |
| 5,796,428 A | * | 8/1998 | Matsumoto et al. ......... 348/231 |
| 5,806,005 A | * | 9/1998 | Hull et al. ................... 455/566 |
| 5,832,422 A | * | 11/1998 | Wiedenhoefer .............. 702/154 |
| 5,838,316 A | * | 11/1998 | Arruza ........................ 345/334 |
| 5,861,918 A | * | 1/1999 | Anderson et al. ........... 348/233 |
| 5,874,966 A | * | 2/1999 | Polimeni et al. ............ 345/131 |
| 5,903,309 A | * | 5/1999 | Anderson .................... 348/333 |
| 5,909,207 A | * | 6/1999 | Ho .............................. 345/156 |
| 5,917,486 A | * | 6/1999 | Rylander ..................... 345/339 |
| 5,917,488 A | * | 6/1999 | Anderson et al. ........... 345/439 |
| 5,943,603 A | * | 8/1999 | Parulski et al. .............. 455/3.1 |
| 5,963,204 A | * | 10/1999 | Ikeda et al. ................. 345/328 |
| 5,991,693 A | * | 11/1999 | Zalewski .................... 701/300 |
| 5,996,080 A | * | 11/1999 | Silva et al. ................. 713/320 |

(List continued on next page.)

FOREIGN PATENT DOCUMENTS

| EP | 0 928 098 | 7/1999 | ............ H04N/1/00 |
| WO | WO98/57294 | 12/1998 | |

*Primary Examiner*—Vijay Shankar

(57) ABSTRACT

A hand-held image capture and communication appliance and method of using same are provided wherein images may be captured via the appliance and saved in an internal memory. The capture and communication appliance includes a processor for manipulating and exhibiting the images on a built-in display screen. Program code stored in the internal memory includes an image attachment module that allows the user to associate captured images with one another (i.e., electronically attach the images) to form a group and provides a graphical representation of this association on the display screen. Moreover, a group of captured images is treated as a single logical unit, which allows operations (e.g., send to another device or appliance, delete, etc.) to be performed on several captured images (i.e., the entire group) at once instead of on an individual basis. According to another aspect of the invention, the program code includes an image detachment module that allows the user to disassociate scanned image(s) (i.e., electronically detach the image(s)) from a previously formed group.

36 Claims, 9 Drawing Sheets

U.S. PATENT DOCUMENTS 5,999,173 A * 12/1999 Ubilos .......................... 345/328
6,002,402 A * 12/1999 Schader ....................... 345/352
6,005,613 A * 12/1999 Endsley et al. ............. 348/231
6,014,689 A * 1/2000 Budge et al. ............... 709/206
6,054,990 A * 4/2000 Tran ............................ 345/358
6,061,060 A * 5/2000 Berry et al. ................. 345/340
6,161,131 A * 12/2000 Garfinkle .................... 709/206
6,167,469 A * 12/2000 Safai et al. ................... 710/62

* cited by examiner

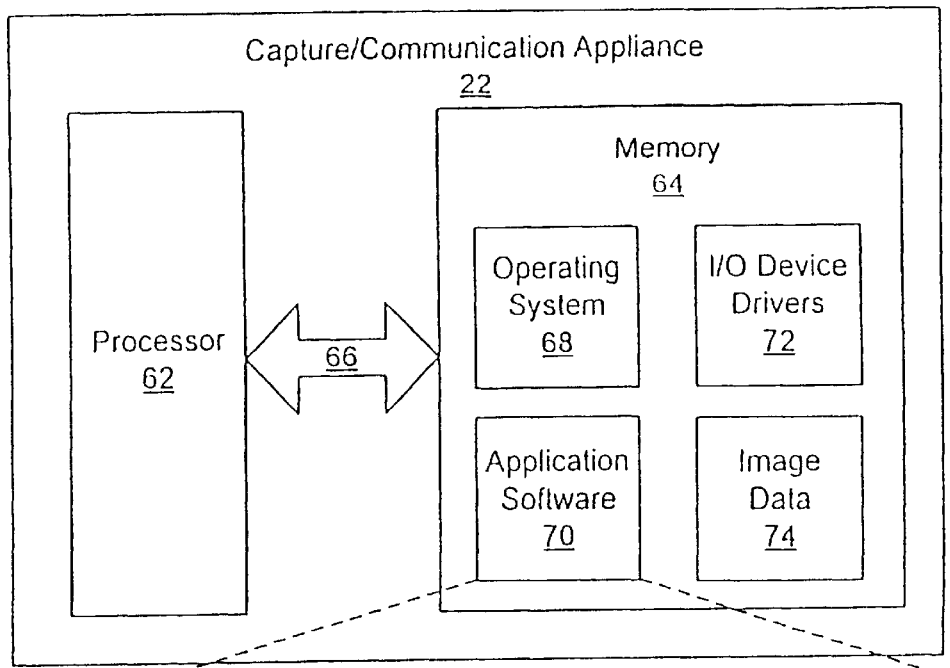
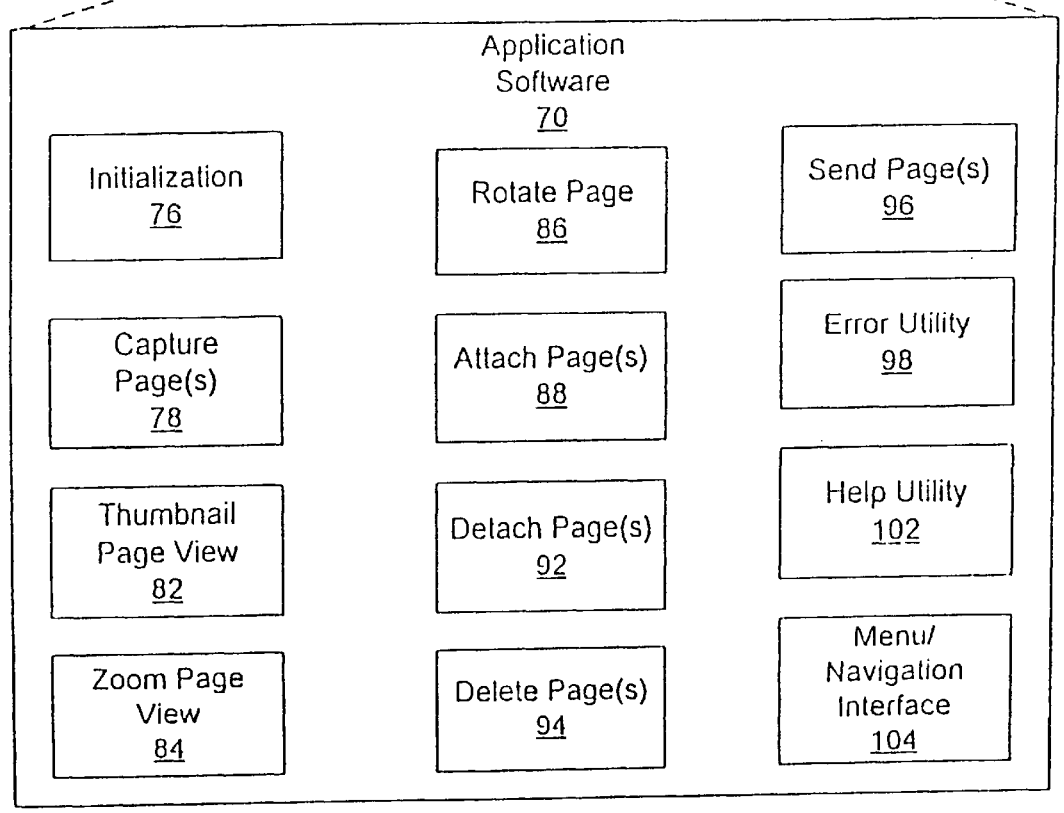
FIG. 2

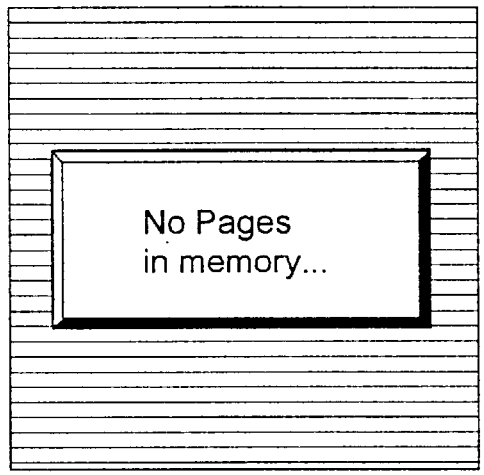
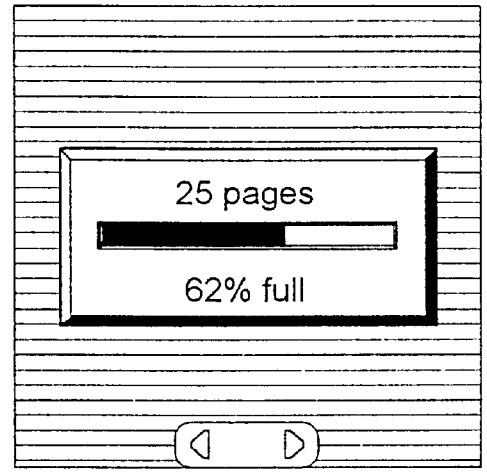
*FIG. 8A*      *FIG. 8B*
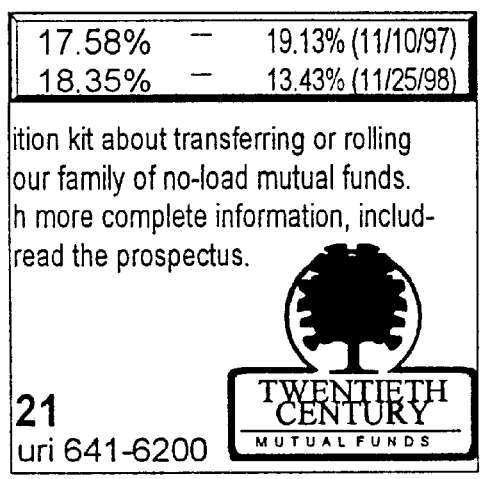
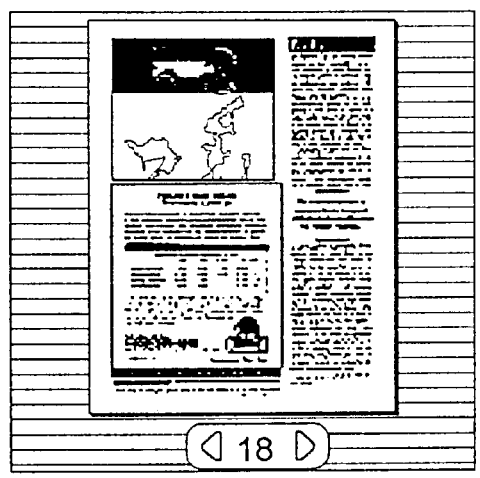
*FIG. 8D*      *FIG. 8C*

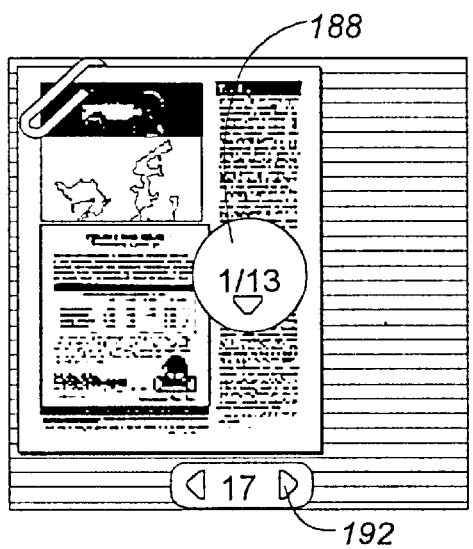 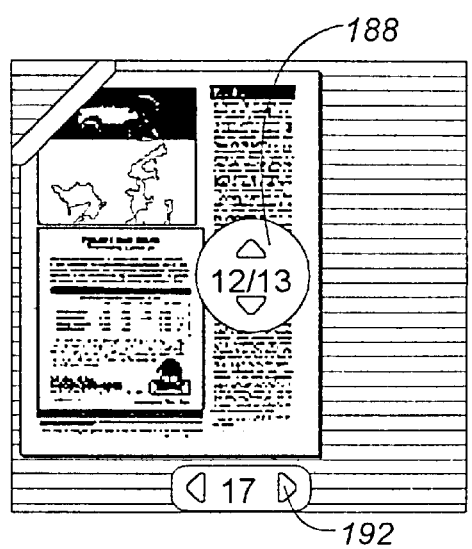
FIG. 10A  FIG. 10B

APPLIANCE AND METHOD OF USING SAME HAVING A CAPABILITY TO GRAPHICALLY ASSOCIATE AND DISASSOCIATE DATA WITH AND FROM ONE ANOTHER

CROSS REFERENCE TO RELATED APPLICATIONS

This application Ser. No. 09/130,869, is related to U.S. application entitled "APPLIANCE AND METHOD OF USING SAME HAVING A SEND CAPABILITY FOR STORED DATA", U.S. application Ser. No. 09/130,080 entitled "APPLIANCE AND METHOD OF USING SAME HAVING A USER HELP CAPABILITY", U.S. application Ser. No. 09/130,573 entitled "APPLIANCE AND METHOD OF USING SAME FOR CAPTURING IMAGES", U.S. application Ser. No. 09/130,082, entitled "APPLIANCE AND METHOD OF USING SAME HAVING A DELETE CAPABILITY FOR SAVED DATA", U.S. application Ser. No. 09/130,081, entitled "APPLIANCE AND METHOD FOR COMMUNICATING AND VIEWING MULTIPLE CAPTURED IMAGES", U.S. application Ser. No. 09/130,584 entitled "APPLIANCE AND METHOD FOR NAVIGATING AMONG MULTIPLE CAPTURED IMAGES AND FUNCTIONAL MENUS", U.S. application Ser. No. 09/130,572 entitled "APPLIANCE AND METHOD FOR CAPTURING IMAGES HAVING A USER ERROR INTERFACE", U.S. application Ser. No. 09/131,258 entitled "APPLIANCE AND METHOD FOR VIEWING CAPTURED IMAGES", and U.S. application Ser. No. 09/130,868 entitled "APPLIANCE AND METHOD FOR MENU NAVIGATION", which are filed contemporaneously herewith and are incorporated herein by reference.

BACKGROUND OF THE INVENTION

The present invention relates generally to the field of graphical user interfaces and, more particularly, to a portable hand-held appliance for capturing images through digital scanning that has a graphical user interface for displaying the captured images for user manipulation and processing, and communicating those images to another device or appliance.

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modern PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, what is sought is a portable, hand-held image capturing device that allows users to process or manipulate captured images in the device and the ability to communicate the images directly to some other unit such as a computer, printer, or facsimile machine. In addition, the image capturing device should provide cordless operation and use a standard interface for transferring images to other devices. A GUI is preferred to assist users, particularly novices, in operating the device.

SUMMARY OF THE INVENTION

Certain objects, advantages, and novel features of the invention will be set forth in the description that follows and will become apparent to those skilled in the art upon examination of the following or may be learned with the practice of the invention.

To achieve the advantages and novel features, the present invention is generally directed to a portable hand-held image capture and communication appliance and method of using same by which images may be captured via capturing means and saved in an internal memory. The appliance includes a processor for manipulating and exhibiting the images on a built-in display screen. Program code stored in the internal memory includes an image or page attachment module that allows the user to associate captured images with one another (i.e., electronically attach the images) to form a group and provides a graphical representation of this association on the display screen.

According to another aspect of the invention, the program code includes an image or page detachment module, which allows the user to disassociate captured image(s) (i.e., electronically detach the image(s)) from a previously formed group and a menu/navigation module that provides the user with a list of possible actions and processes responses thereto.

The page attachment module includes code segments for displaying an animation that is a graphical representation of pages attached to one another to form a group. In the preferred embodiment, the animation shows a page or group come into view on the display to substantially overlay the page or group being attached to form a new group. An icon that serves as a metaphor for the attachment (e.g., a paper-clip) is placed in motion on the display during the overlay process and comes to rest once the grouping is complete. The animation completes with the overlaying page or group folding to the back of the new group, displaying the attached page or group. The overlay of the images combined with the behavior of the attachment metaphor provides a visual cue for the user that the pages have indeed been electronically attached or grouped. Pages within a group are displayed in response to user input by folding pages to the back of the group to move towards the last image of the group and by folding pages to the front of the group to move towards the first page of the group. A momentary icon is displayed on the screen when the group is first formed and as the user navigates within the group that identifies the logical position of the current page in the group.

The image detachment module includes code segments for displaying an animation that is a graphical representation of page(s) detaching from a group. In the preferred embodiment, the user navigates within the group by folding pages to the back of the group until reaching a page where the group is to be divided. If detachment is chosen from a menu provided on the display screen, the pages that were folded behind the group will fold back to the front of the group and will then be removed from the display screen, creating a separate group. Similar to the attachment animation, an icon that serves as a metaphor for the attachment or grouping (e.g., a paper-clip) is placed in motion on the display during the removal process. If more than one page remains after the detachment, the icon will come to rest to identify the remaining images as a group. If only one image remains, the icon disappears.

The appliance according to the present invention has many advantages, a few of which are highlighted hereafter, as examples.

One advantage of the invention is that intelligent image processing features, normally reserved for a traditional computer, are provided in a portable, hand-held image capturing appliance.

Another advantage of the invention, which is related to the image processing capabilities of the appliance, is that captured images can be combined into logical groups that can be treated as an individual unit both internal to the appliance or when transferring the images to another system.

Still another advantage of the invention is that once these logical groups are formed, they can be split into smaller groups or back into individual pages if so desired.

Yet another advantage of the invention is that a GUI is provided, including metaphoric icons and animations, that allows new users to operate the appliance with minimal training or assistance.

Another advantage of the invention is that it allows more images to be captured and then found later.

Still another advantage of the invention is that grouping images together improves visual searching.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which:

FIG. 2 is a high-level block diagram of the internal hardware and software architecture of the appliance illustrated in FIGS. 1A–1D;

FIGS. 8A and 8B depict memory usage indicator icons on the display screen of FIG. 1A that provide a memory utilization report for the appliance;

FIG. 8C illustrates a thumbnail view of a captured image on the display screen of FIG. 1A;

FIG. 8D illustrates a zoom view of a captured image on the display screen of FIG. 1A;

FIG. 10A illustrates a thumbnail view on the display screen of FIG. 1A of the first page of a set of attached pages; and FIG. 10B illustrates a thumbnail view on the display screen of FIG. 1A of the twelfth page of a set of attached pages.

DETAILED DESCRIPTION OF THE PREFERRED EMBODIMENT

Figure 1A:
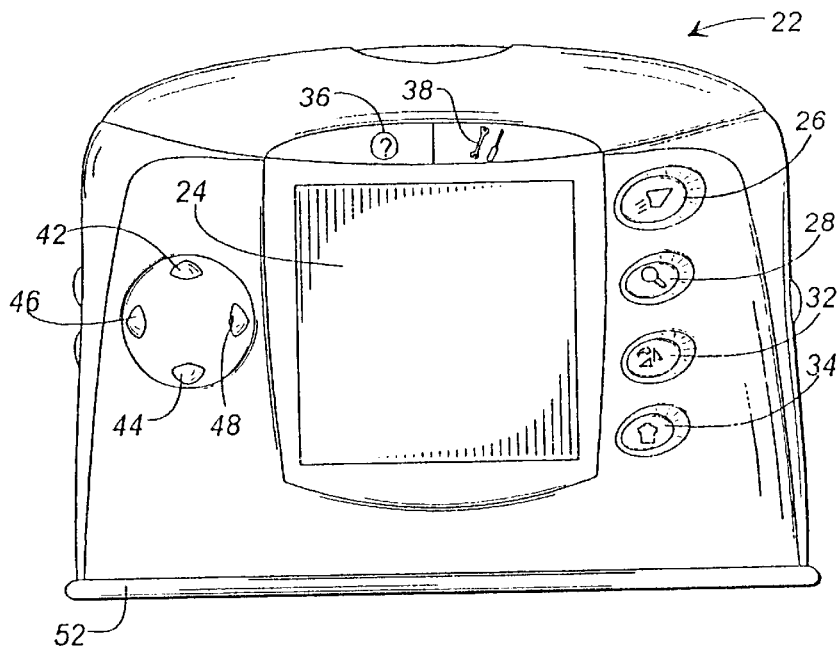
FIG. 1A is an elevation view of the hand-held image capture and communication appliance according to the present invention, which depicts a side of the unit containing the display screen, operation buttons, and navigation buttons.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Architecture of the Image Capture and Communication Appliance

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, and liquid crystal displays (LCDs). Display 24 is the means by which information, including captured images, text, icons, and animations, is communicated to the user. As used herein, the term "image" encompasses both text (binary) and color, graphic, or gray-scale visuals. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been captured into memory through photoelement array 52. Note that an image captured in memory is interchangeably referred to herein as a "page" because the image is portrayed in appliance 22 as a physical page of text and/or imagery. Activation of tools button 38 presents the user with a menu that includes possible image operations (e.g., image attachment/grouping, image detachment/ungrouping), changing the mode of appliance 22 (i.e., toggling between text (binary) capture and color, graphic or grayscale capture modes), calibrating appliance 22, displaying a screen identifying important specifications such as a model number, hardware or software release number, memory equipage, etc., or other user utilities not deserving of a dedicated external button for activation. Help button 36 provides the user with access to general tutorials, process animations, how-to instructions on the operation of appliance 22, and context sensitive instruction when help is requested while another operation or menu is active. The navigation buttons include an up button 42, a down button 44, a left button 46, and a right button 48 and are controlled by the user to steer a course through menu items and to view images or pages that have been captured in memory.

Figure 1B:
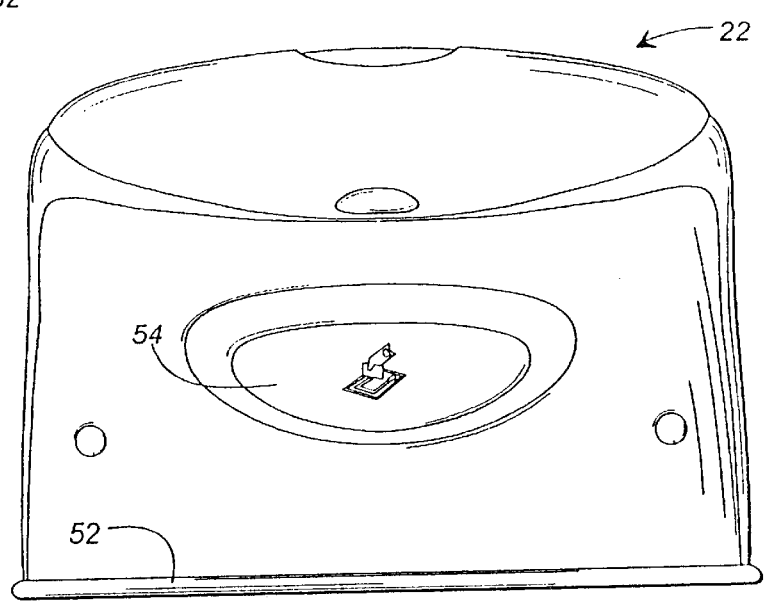
FIG. 1B is an elevation view of the appliance of FIG. 1A depicting the opposing side to that illustrated in FIG. 1A, which contains the capture button for performing an image capture.
Figure 1C:
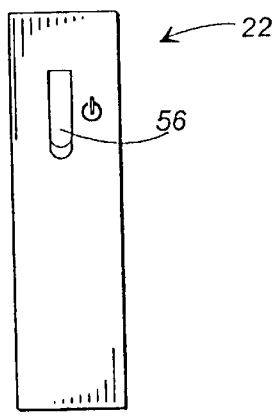
FIG. 1C is an elevation view of the appliance of FIGS. 1A and 1B depicting an end of the unit, which contains the power switch.
Figure 1D:
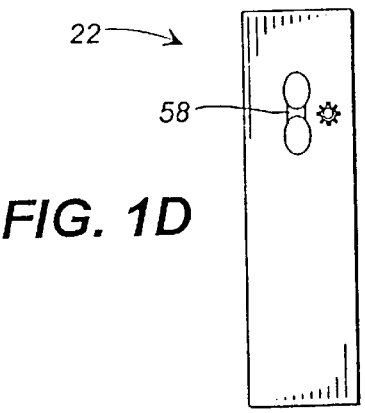
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to capture an image through photoelement array 52 and is released once the image is captured. A power switch 56 is included at one end of appliance 22 as shown in FIG. 1C and a brightness control 58 for display 24 is located at the other end of appliance 22 as shown in FIG. 1D. The positioning of the various buttons, power switch 56, and brightness control 58 on appliance 22 as shown in FIGS. 1A through 1D is merely exemplary and can be modified as needed to satisfy the ergonomic requirements of the targeted user community.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each capture. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., 3260 Jay Street, Santa Clara, Calif. 95054-3309, which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the CCITT standard, which is used in the preferred embodiment of the present invention; however, other public or proprietary standards can be used with equal success. For example, JPEG is a common standard used to encode graphic or color images. Finally, application software 70 comprises the control programs that implement the various features of appliance 22. Application software 70 and devices drivers 72 are typically written in a high-level programming language such as C or C++for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72. Assembly language is used to implement time-critical code segments.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. A brief overview of each of the aforementioned modules follows hereafter.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. For example, FIGS. 8A and 8B show a memory usage indicator icon for the cases where memory 64 is empty (i.e., no captured pages in memory) and where memory 64 holds 25 captured pages. In FIG. 8C, thumbnail view module 82 presents an entire captured page on display 24. Zoom view module 84 allows the user to magnify a portion of a page as illustrated in FIG. 8D. Page rotation module 86 allows the user to rotate a page either in thumbnail or zoom view in 90° increments. Attach page module 88 allows the user to logically join pages together to form a group of pages that can be manipulated as an individual unit. Conversely, detach page module 92 allows the user to separate a page or pages from a previously formed group. The operation of both attach page module 88 and detach page module 92 will be discussed in detail hereinafter. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions through text and animation for operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages.

Figure 3:
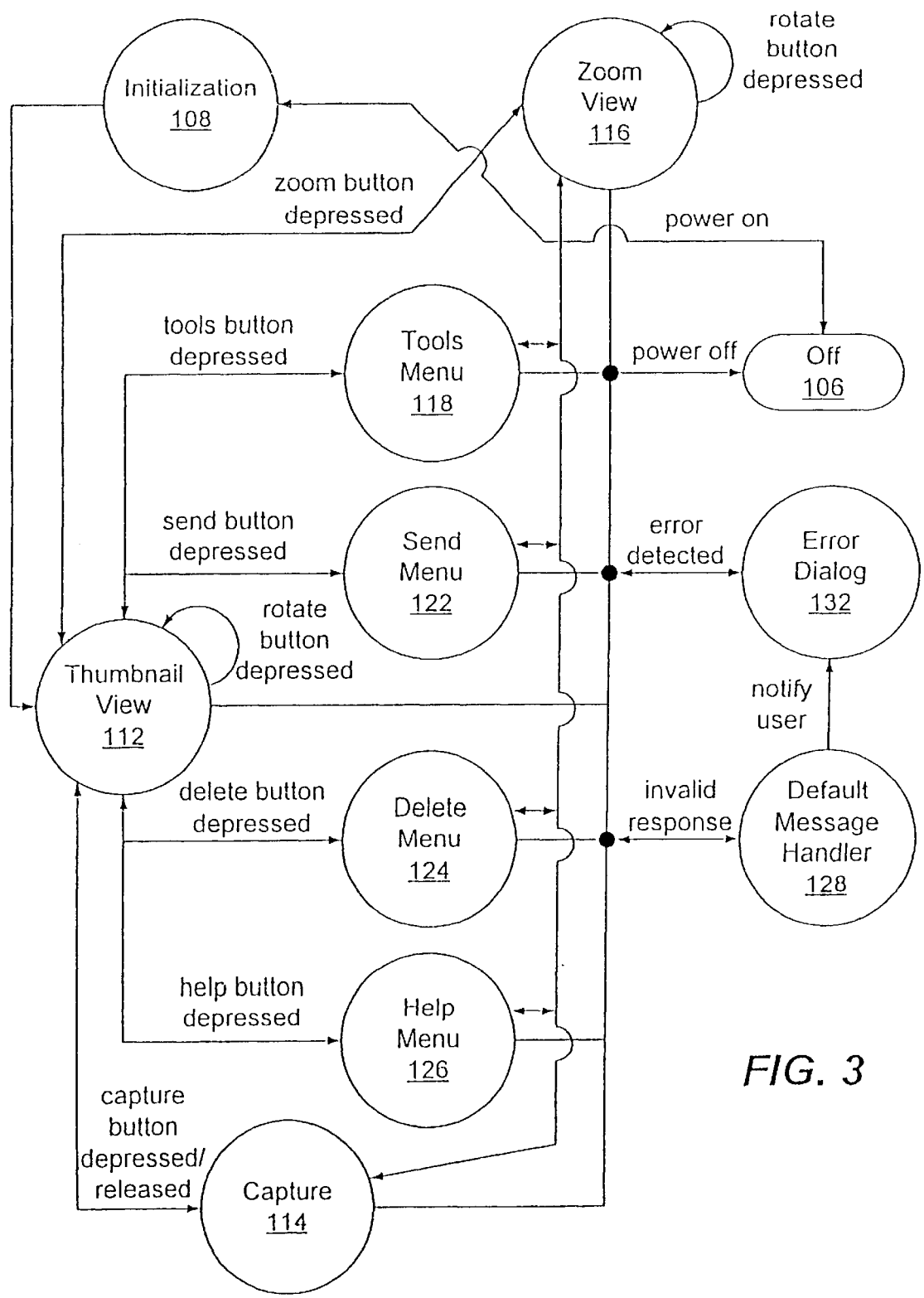
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28.

Figure 4A:
FIGS. 4A and 4B illustrate the tools menus displayed on the display screen of FIG. 1A.
Figure 4B:
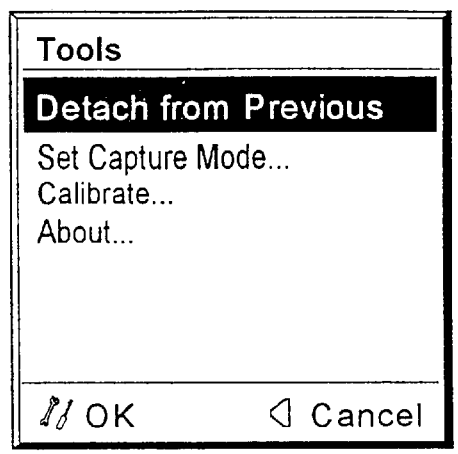
Figure 5:
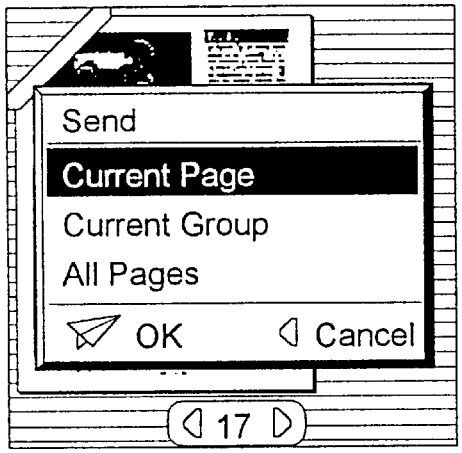
FIG. 5 illustrates the send menu displayed on the display screen of FIG. 1A.
Figure 6:
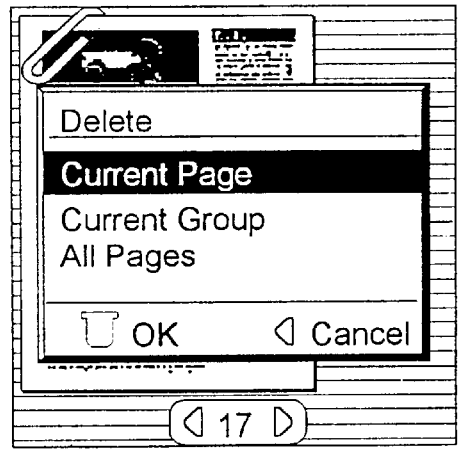
FIG. 6 illustrates the delete menu displayed on the display screen of FIG. 1A.
Figure 7:
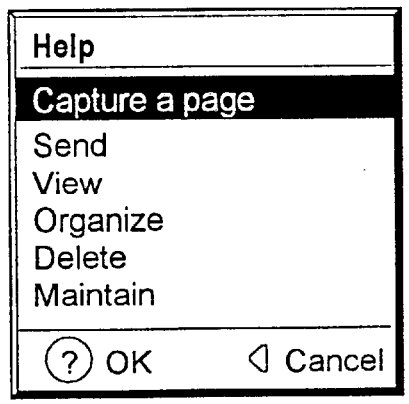
FIG. 7 illustrates the help menu displayed on the display screen of FIG. 1A.

From thumbnail view state 112 or zoom view state 116, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4 through 7. Menu states may be exited by simply invoking navigation button 46 to transition to a previous state.

An invalid response by the user (i.e., user presses an inactive button) will result in a transition to the default message handler state 128 where the user response is interpreted through the message that was generated internally. Frequently, the invalid response by the user will simply be ignored. Nevertheless, depending on the button that was invoked and the current state of application software 70, a transition is sometimes made to the error dialog state 132 to notify the user of their error via a message or graphic (e.g., a blinking icon) on display 24. Alternatively, error dialog state 132 can be entered directly if application software 70 detects an error in the execution of a valid operation. The most common example of this is when the user follows an improper capture path with appliance 22 during the image capture process.

The features provided by the attach page software module 88 and the detach page software module 92 will be described hereafter with frequent reference to (a) the architecture and operation of the application software 70 of FIG. 2; (b) the captured page illustrations of FIGS. 8C, 8D, 10A and 10B; and (c) the flow charts of FIGS. 9A and 9B.

Operation of the Page Attachment Feature

Both the page attachment and detachment features of appliance 22 are exercised through tools button 38, which displays the two preferred tool menus illustrated in FIGS. 4A and 4B. Thus, as represented by decision diamond 134 in FIG. 9A, the process begins with menu/navigation interface module 104 (see FIG. 2) processing a message indicating that tools button 38 has been activated. Depending on the current state of application software 70, this response may not be valid as indicated by decision diamond 136. If tools button 38 is not currently active or live, error utility software module 98 may optionally be invoked to notify the user that the tools button is presently inactive in step 138. If, however, tools button 38 is active, menu/navigation interface module 104 will determine if an inner page of a group (i.e., a page other than the first page) is currently displayed at decision diamond 142. If an inner page of a group is presently on display, then the preferred embodiment of the present invention allows only a detachment from this state, which is represented by termination B and described in detail in the following section. Otherwise, if a single page or the first page of a group or the memory usage indicator (see, FIGS.

8A and 8B) is on display, the process continues by following termination A where the tools menu offering the attach option is exhibited on display 24 in step 144 as shown in FIG. 4A. At decision diamond 148, menu/navigation interface module 104 will determine whether any prior pages exist that have not been attached to the present page or group. If no prior page or group exists, then there is nothing for the present page or group to attach to and, therefore, the attach option is displayed with a gray tint in step 152 to inform the user that under the present circumstances attach is not a valid option.

In the preferred embodiment, the present invention has adopted the convention that a page or group is attached to the end of a preceding page or group stored in memory 64. The ordering of the pages and groups in memory is dictated by the order in which the pages were captured. A user can review the logical ordering of the pages in memory 64 by using navigation buttons 46 and 48 (see FIG. 1A) to consecutively display the images in the thumbnail view mode as illustrated in FIG. 8C. Nevertheless, alternative attachment conventions can be employed to adapt to changing or differing user preferences. For example, a skilled software developer may wish to design application software 70 such that a current page or group attaches to the front of a following page or group in memory 64. According to another alternative embodiment, the user could electronically tag or mark pages stored in memory 64 by pressing a button when they are displayed. The order in which the tags are made is analyzed by application software 70 and stored in memory 64. When attach page module 88 is invoked, a group is formed of the tagged pages and ordered according to the sequence in which the pages were tagged.

Returning now to FIG. 9A, if a prior page or group exists, then the attach option will be highlighted on the tools menu in step 154 as shown in FIG. 4A. The page attachment process continues at termination C in FIG. 9B. As shown in FIG. 4A, the tools menu can be exited through activation of navigation button 46. Thus, at decision diamond 156, if the tools menu is exited, the page attachment process ends at step 158. Similarly, the user can select other options from the tools menu by using navigation buttons 42 and 44 as represented by decision diamond 162. If the user has chosen to highlight other options from the tools menu (see, FIG. 4A), a determination will be made at decision diamond 164 whether the attach option remains the selected item. A selection from the tools menu is confirmed by invoking tools button 38 for the second time (the first invocation displayed the tools menu on display 24). This determination is represented by decision diamonds 166 and 168. If the user did not navigate the tools menu or if the menu was navigated but the user settled on the attach option, the process follows decision diamond 166. On the other hand, if the user chose to navigate the tools menu and selected another item besides the attach option, the process follows decision diamond 168. If another option is confirmed at decision diamond 168 through tools button 38, the page attachment process is exited at step 172. Otherwise, if page attachment is confirmed through invocation of tools button 38 at decision diamond 166, the page attachment process will continue by following termination E. if the user does not confirm a selection from the tools menu at either decision diamond 166 or 168, the attachment process follows termination C, where application software 70 waits for the user to confirm a selection from the tools menu or exit the tools menu.

At termination E control is transferred to attach page module 88 where a determination will be made at decision diamond 174 whether the present page or group is displayed in zoom view as shown in FIG. 8D. If the page or group is currently in zoom view, then the display mode will return to thumbnail view in step 176 as shown in FIG. 8C before displaying the attachment animation in step 178.

The attachment animation provided by attach page module 88 in step 178 is designed to convey to the user that the pages have been electronically grouped in memory 64 as an individual unit and can be manipulated or processed as an individual unit. Nevertheless, the icons and the animation used should still impress upon the user that individual pages within a group can still be accessed. In the preferred embodiment of the present invention, this is accomplished through an animation, scenes of which are illustrated in FIGS. 10A and 10B, in which the previous page or group of pages is shown to slide onto the screen to substantially overlay the present page or group of pages. While the page overlay is in progress, an icon that serves as a metaphor for page attachment is placed in motion on display 24 to confirm in the user's mind that a page attachment is taking place. A paper-clip is the iconic metaphor chosen for the preferred embodiment as shown in FIG. 10A; however, any suitable symbol can be used that is shown to leave users with the impression that an attachment is in progress.

Once the overlay has completed, the previous page or group of pages that slid onto display screen 24 fold back behind the original page or group of pages, as shown in FIG. 10B, to reveal the original page or group of pages on display when the attachment option is chosen. Advantageously, the folded corner of the page on display as shown in FIG. 10B conveys to the user that the current page on display is an inner page of a group. A momentary icon 188, known as a round license plate in the preferred embodiment, is displayed briefly to indicate the logical position of the page on display within the group of pages. For example, in FIG. 10B the current page on display is the twelfth page of a thirteen page group. Momentary icon 188 also provides the user with a visual prompt that navigation buttons 42 and 44 can be used to move either backward (i.e., towards the first page) or forward (i.e., towards the last page) within the group.

Finally, in step 182, icon 192, commonly referred to as the license plate in the preferred embodiment, is updated to reflect the logical position of the current groups in the entire sequence of pages and groups stored in memory 64. During an attachment operation, two logical units (i.e., a page or group) have been merged. Therefore, the number on icon 192 is decremented by one in step 182. Similar to momentary icon 188, icon 192 provides the user with a visual prompt that navigation buttons 46 and 48 can be used to review the stored pages and groups with the number on icon 192 indicating the logical position of an individual page or group in the entire sequence. Groups are distinguished from individual pages through use of the attachment metaphor (e.g., paper-clip in the preferred embodiment) and momentary icon 188, which are displayed whenever a user comes upon a group through navigation buttons 46 and 48.

A particularly useful application of the page attachment feature is to combine pages into a group for transfer to another appliance, device, or system (e.g., computer, printer, facsimile machine, etc.). Appliance 22 includes an image send or transmit button 26 (see FIG. 1) through which menu/navigation interface module 104 and send page module 96 (see FIG. 2) are invoked for transferring a page or group of pages to another system through the unit's serial or IR communication ports. As shown in FIG. 5, menu/navigation module 104 will display a "send" menu in response to a user activating the send or transmit button 26, which provides the user with a choice of transmitting the current page, the current group of pages, or all the pages currently stored in memory 64 of appliance 22. Send page module 96 will carry out the user's transmit request once a selection from the menu is confirmed. Advantageously, the grouping feature of the present invention allows the user to transmit, as a group or logical unit, a subset of pages stored in memory 64 without the inconvenience of having to transmit the desired pages one at a time or transferring all pages in memory and then discarding the unwanted pages. In addition, the pages do not need to be combined at the destination for common processing as the group retains its unitary character after transfer.

The present invention follows a paradigm in which the image capture process is divorced from the page manipulation features such as page attachment or grouping. Alternative approaches can be taken, however, that combine the image capture process with page grouping. One such embodiment allows the user to identify through a menu option or an assigned operation button the choices of beginning and ending a group. For example, once a user chooses to begin a group, every image captured by appliance 22 after that choice was made would be added to the group until the user chooses to end the group. If no choice is made by the user with regard to grouping, then appliance 22 defaults to a single page capture mode. Another alternative embodiment for implementing page grouping is to require the user to insert an electronic separator before an image is captured, through a menu option or an assigned operation button, to indicate the beginning of a new group, and to prevent the newly captured image from being added to previously captured images as part of a previous group. These alternative approaches have the advantage that page groups can be formed at the time the images are captured; however, the user must stay aware of the mode of operation (i.e., group mode or non-group mode) and be alert to insert separators where necessary to construct the desired page groups.

Operation of the Page Detachment Feature

Figure 9A:
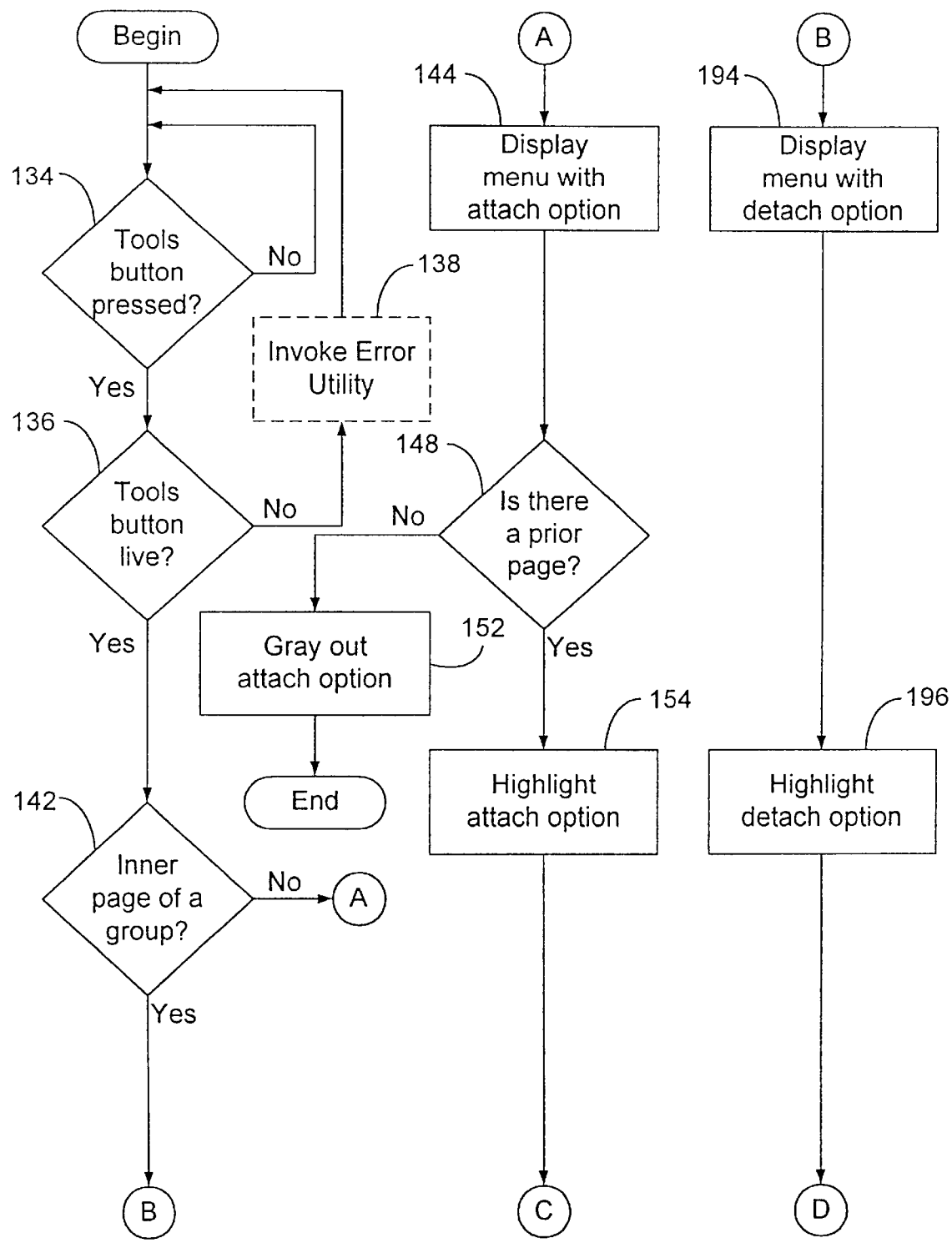
FIGS. 9A, 9B, and 9C are a flow chart describing the operation of the attach page and detach page software modules of FIG. 2.
Figure 9B:
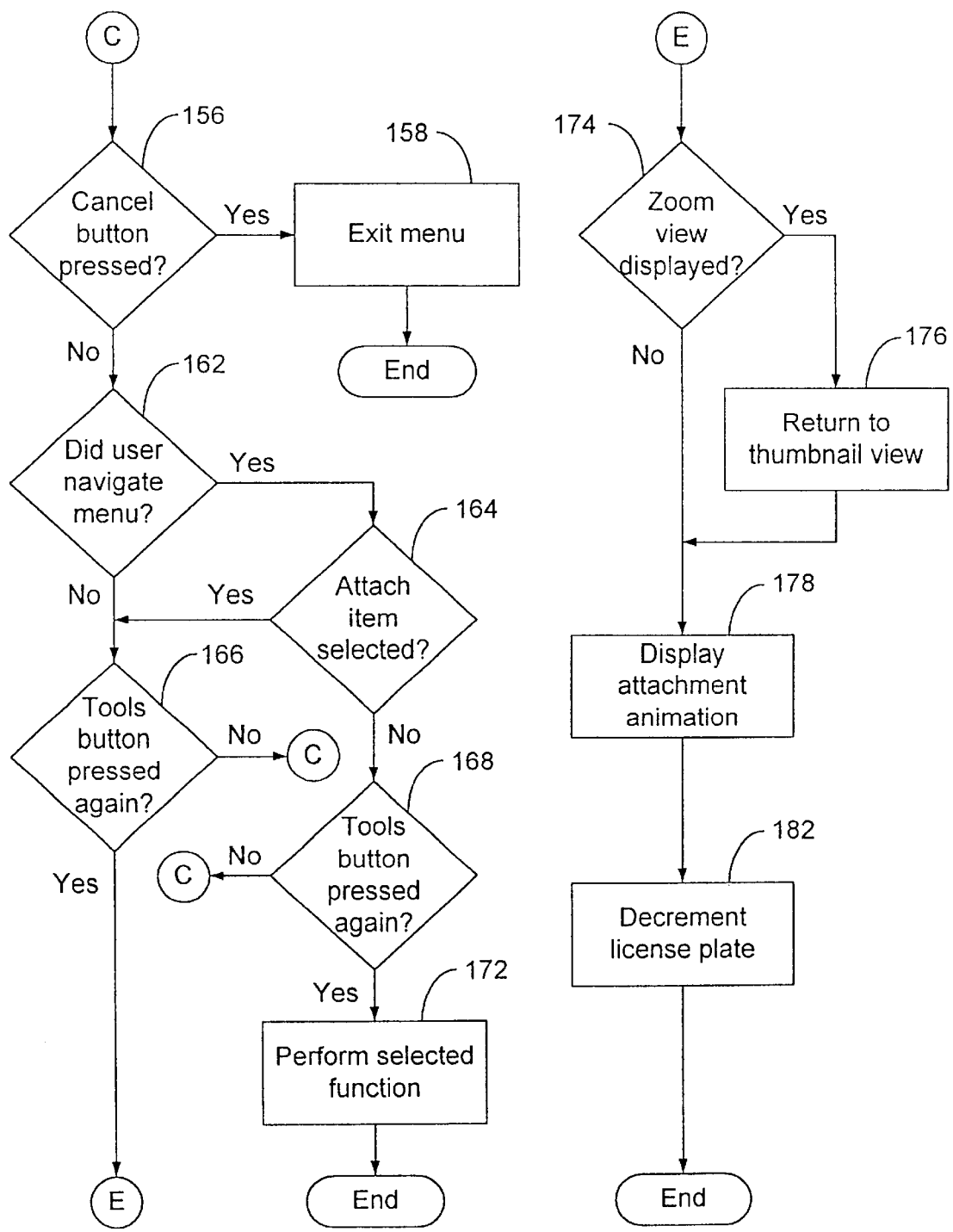
Figure 9C:
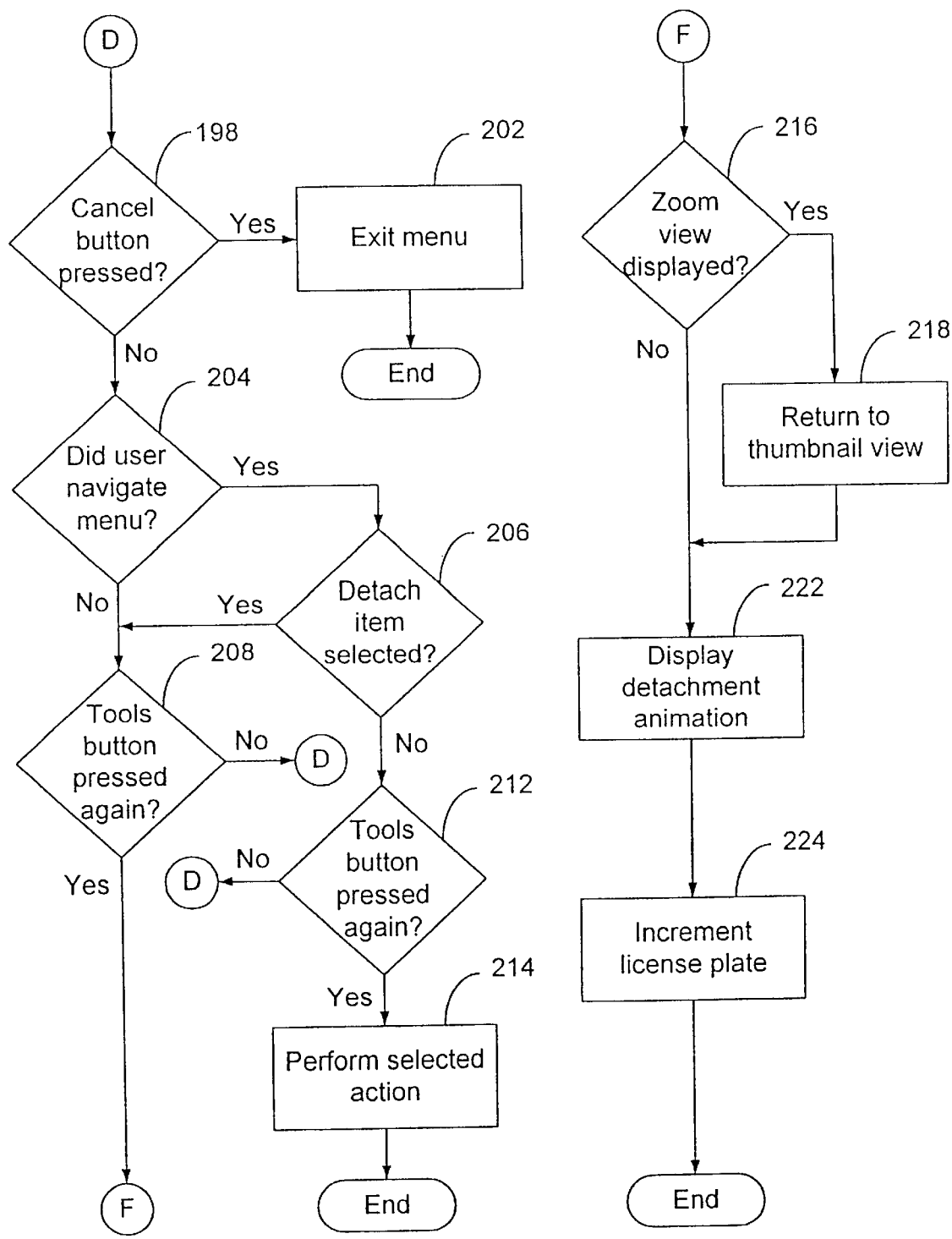

Turning next to the page detachment feature of appliance 22, the discussion begins with termination B in FIG. 9A. If an inner page of a group is presently on display, the preferred embodiment of the present invention allows only a detachment from this state and, therefore, the tools menu offering the detach option is exhibited on display 24 in step 194 as shown in FIG. 4B. The detach option will be highlighted on the tools menu in step 196 as shown in FIG. 4B. The page detachment process continues at termination D in FIG. 9C. As shown in FIG. 4B, the tools menu can be exited through activation of navigation button 46. Thus, at decision diamond 198, if the tools menu is exited, then the page detachment process ends at step 202. Similarly, the user can select other options from the tools menu by using navigation buttons 42 and 44 as represented by decision diamond 204. If the user has chosen to highlight other options from the tools menu (see, FIG. 4B), a determination will be made at decision diamond 206 whether the detach option remains the selected item. A selection from the tools menu is confirmed by invoking tools button 38 for the second time (the first invocation displayed the tools menu on display 24). This determination is represented by decision diamonds 208 and 212. If the user did not navigate the tools menu or if the menu was navigated but the user settled on the detach option, the process follows decision diamond 208. On the other hand, if the user chose to navigate the tools menu and selected another item besides the detach option, the process follows decision diamond 212. If another option is confirmed at decision diamond 212 through tools button 38, the page detachment process is exited at step 214. Otherwise, if page detachment is confirmed through invocation of tools button 38 at decision diamond 208, the page detachment process will continue by following termination F. If the user does not confirm a selection from the tools menu at either decision diamond 208 or 212, the detachment process follows termination D, where application software 70 waits for the user to confirm a selection from the tools menu or exit the tools menu.

At termination F, control is transferred to detach page module 92 where a determination will be made at decision diamond 216 whether the present group is displayed in zoom view as shown in FIG. 8D. If the group is currently in zoom view, then the display mode will return to thumbnail view in step 218 as shown in FIG. 10B before displaying the detachment animation in step 222.

The detachment animation provided by detach page module 92 in step 222 is designed to convey to the user that the page currently on display and any pages following that page in the group are being removed from the present group to form a separate page or group. In the preferred embodiment of the present invention, this is accomplished through an animation, scenes of which are illustrated in FIGS. 10A and 10B.

The animation begins with the display shown in FIG. 10B in which an inner page of a group is on display with the upper left hand corner folded to represent the preceding pages of the group folded behind. As momentary icon 188 indicates, the displayed page is the twelfth of thirteen pages. Thus, a detachment will separate pages twelve and thirteen from the preceding eleven pages in the group. As the animation progresses, preceding pages one through eleven are shown to fold over to substantially overlay the presently displayed page (i.e., page twelve in FIG. 10B) as if the pages were held together at the upper left hand corner. At this stage of the animation, the first page of the group will be displayed as shown in FIG. 10A but without the presence of momentary icon 188. In addition, the icon that serves as a metaphor for page attachment is placed in motion on display 24 to confirm in the user's mind that the current group is undergoing a transformation. A paper-clip is the iconic metaphor chosen for the preferred embodiment as shown in FIG. 10A.

Once the fold over has completed, the preceding page or group of pages that participated in the fold over slide off display 24 to reveal the inner page of the group on display when the detachment option was chosen. In the example of FIG. 10B, page 12 would be exhibited on display 24 with the paper-clip icon at the top left hand corner, as illustrated in FIG. 10A, to indicate the present page is part of a group. If, for example, only one page remained (i.e., the last page of a group was detached) then, the paper-clip icon would disappear. If applicable, then momentary icon 188 (a.k.a., round license plate) is displayed briefly to indicate that the page on display is the first page of a group of pages. In the present example in which FIG. 10B served as the starting point, icon 188 should read 1/2 as pages 12 and 13 were detached from the group to form a new group.

Finally, in step 224, icon 192 (a.k.a., license plate) is updated to reflect the logical position of the current group in the entire sequence of pages and groups stored in memory 64. During a detachment operation, one logical unit (i.e., a group) has been split into two logical units (i.e., page or group). Therefore, the number on icon 192 is incremented by one.

It is important to emphasize that while the present invention has been illustrated herein with reference to an image capture and communication appliance, the GUI and human-machine interface features of the present invention are applicable to any device or appliance that stores information as data entities or files. Examples of such devices include digital cameras, video recording devices (e.g., video stored in digital form), audio recording devices (e.g., audio stored in digital form), portable fax machines, desktop, laptop, and hand-held computing devices. Furthermore, it is envisioned that the methods disclosed herein for associating and disassociating image data with and from one another can likewise be used in any device or appliance that stores data as logical entities that can be combined and separated.

Application software 70, which, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The principles of the present invention have been disclosed herein as embodied in a portable, hand-held image capture and communication appliance that provides the flexibility of traditional hand-held scanners yet offers an array of intelligent features not heretofore known in the art. Examples of these features include the ability to collect captured images into logical groups that can be treated as an individual unit both internal to the appliance or when transferring the images to another device or system. Conversely, groups of images can be split into smaller groups or individual pages as desired. A GUI is provided that includes metaphoric icons and animations that allow even a novice user to successfully operate the appliance with minimal or no outside instruction. It is these intelligent features that place the present invention in a new class of products known as electronic information appliances that merge the functionality of electronic peripheral devices, such as image scanners, with the processing capabilities and graphical interface used in computers.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A image capture and communication appliance, comprising:

a photoelement array for capturing image data;

a memory for saving said image data;

a processor in communication with said memory;

a display in communication with said processor for exhibiting said image data; and program code stored in said memory and executed by said processor, said program code comprising an image attachment module for graphically associating image data from a first captured image with image data from a second captured image to form a group, and an image detachment module for graphically disassociating image data from said first captured image with image data from said second captured image, said first captured image data being previously associated with said second captured image data.

2. The appliance of claim 1, wherein said image attachment module comprises:

a first code segment for graphically associating image data from a captured image with image data from a group of captured images; and a second code segment for graphically associating image data from said first group of captured images with image data from said second group of captured images.

3. The appliance of claim 1, wherein said image detachment module comprises:

a first code segment for graphically disassociating image data from a captured image with image data from a group of captured images; and a second code segment for graphically disassociating image data from a first group of captured images with image data from a second group of captured images.

4. A hand-held scanner appliance, comprising:

capturing means for acquiring image data for said scanner;

storage means for saving said image data;

processing means in communication with said storage means;

display means in communication with said processing means for exhibiting said image data; and program code stored in said storage means and executed by said processing means, said program code comprising an image attachment module for graphically associating image data from a first captured image with image data from a second captured image to form a group, and an image detachment module for graphically disassociating image data from said first captured image with image data from said second captured image, said first captured image data being previously associated with said second captured image data.

5. The appliance of claim 4, wherein said program code further comprises:

a menu module for displaying valid appliance operations on said display means based on a current state and processing any user response thereto.

6. The appliance of claim 4, wherein said image detachment module comprises:

a first code segment for displaying an animation on said display means, said animation representing the disassociation of said first captured image data from said second captured image data.

7. The appliance of claim 6, wherein said first code segment comprises:

a second code segment for folding said second captured image substantially behind said first captured image;

a third code segment for folding said second captured image over the front of said first captured image such that said second captured image substantially overlays said first captured image;

a fourth code segment for removing said second captured image from said display means to reveal said first captured image; and a fifth code segment for imparting movement to a metaphoric icon that is symbolic of a state of attachment.

8. The appliance of claim 7, wherein said metaphoric icon is a paper-clip.

9. The appliance of claim 4, wherein said image attachment module comprises:

a first code segment for displaying an animation on said display means, said animation representing the association of said first captured image data with said second captured image data as said group.

10. The appliance of claim 9, wherein said first code segment comprises:

a second code segment for substantially overlaying said first captured image with said second captured image; and a third code segment for imparting movement to a metaphoric icon that is symbolic of a state of attachment.

11. The appliance of claim 10, wherein said first code segment further comprises:

a fourth code segment for folding said second captured image substantially behind said first captured image; and a fifth code segment for displaying a momentary icon representing a logical position of said first captured image in said group.

12. The appliance of claim 10, wherein said metaphoric icon is a paper-clip.

13. A hand-held image capture and communication system, comprising:

a memory for holding information stored as a plurality of data entities;

a processor in communication with said memory;

a display in communication with said processor for exhibiting said data entities;

program code stored in said memory and executed by said processor, said program code comprising:

an image attachment module for graphically associating a first data entity with a second data entity to form a group; and an image detachment module for graphically disassociating a data entity from a previously formed group.

14. A method for graphically associating images in a hand-held image capture and communication appliance, comprising the steps of:

capturing a first image with said appliance;

saving said first image in a storage medium associated with said appliance;

capturing a second image with said appliance;

saving said second image in said storage medium;

displaying said second image on a display associated with said appliance;

associating said second image with said first image to form a group; and displaying an animation on said display that shows said first image progressively overlaying said second image to represent said associating step.

15. The method of claim 14, further comprising the steps of:

displaying valid appliance operations on said display means based on a current state; and processing any user response to said display of valid appliance operations.

16. The method of claim 14, wherein said displaying an animation step further comprises:

imparting movement to a metaphoric icon that is symbolic of a state of attachment.

17. The method of claim 16, wherein said displaying an animation step further comprises:

folding said first captured image substantially behind said second captured image; and displaying a momentary icon representing a logical position of said second captured image in said group.

18. The method of claim 16, wherein said metaphoric icon is a paper-clip.

19. A method for graphically associating data entities in a system having a display means, comprising the steps of:

providing first and second data entities;

displaying said second data entity on the display means;

associating said second data entity with said first data entity to form a group; and displaying an animation on the display that shows said first data entity progressively overlaying said second data entity to represent said associating step.

20. A method for graphically disassociating images stored in a hand-held image capture and communication appliance, comprising the steps of:

capturing a first image with said appliance;

saving said first image in a storage medium;

capturing a second image with said appliance;

saving said second image in said storage medium;

associating said second image with said first image to form a group;

displaying said group on a display means;

disassociating said second image from said group; and displaying an animation on said display means that represents said disassociating step.

21. The method of claim 20, further comprising the steps of:

displaying valid appliance operations on said display means based on a current state; and processing any user response to said display of valid appliance operations.

22. The method of claim 20, wherein said displaying said animation step comprises:

folding said first captured image substantially behind said second captured image;

folding said first captured image over the front of said second captured image such that said first captured image substantially overlays said second captured image; and removing said first captured image from said display means.

23. The method of claim 22, wherein said displaying said animation step further comprises:

imparting movement to a metaphoric icon that is symbolic of a state of attachment.

24. The method of claim 23, wherein said metaphoric icon is a paper-clip.

25. A method for graphically disassociating data entities in a system having a display means, comprising the steps of:

providing first and second data entities;

displaying said second data entity on the display means;

associating said second data entity with said first data entity to form a group; and displaying said group on the display means;

disassociating said second data entity from said group; and displaying an animation on the display means that represents said disassociating step.

26. A computer readable medium having a program for manipulating image data acquired by a hand-held image capture and communication appliance, said program comprising:

logic configured for graphically disassociating image data from a first captured image with image data from a second captured image.

27. The computer readable medium of claim 26, further comprising:

logic configured for graphically associating image data from a first captured image with image data from a second captured image.

28. The computer readable medium of claim 26, further comprising:

logic configured for displaying valid appliance operations on a display means based on a current state and processing any user response thereto.

29. The computer readable medium of claim 26, wherein said image disassociation logic comprises:

logic configured for displaying an animation on a display means, said animation representing the disassociation of said first captured image data from said second captured image data.

30. The computer readable medium of claim 29, wherein said animation display logic comprises:

logic configured for folding said first captured image substantially behind said second captured image;

logic configured for folding said first captured image over the front of said second captured image such that said first captured image substantially overlays said second captured image;

logic configured for removing said first captured image from said display means to reveal said second captured image; and logic configured for imparting movement to a metaphoric icon that is symbolic of a state of attachment.

31. The computer readable medium of claim 30, wherein said metaphoric icon is a paper-clip.

32. The computer readable medium of claim 27, wherein said image association logic comprises:

logic configured for displaying an animation on a display means, said animation representing the association of said first captured image data with said second captured image data as said group.

33. The computer readable medium of claim 32, wherein said animation display logic comprises:

logic configured for substantially overlaying said second captured image with said first captured image; and logic configured for imparting movement to a metaphoric icon that is symbolic of a state of attachment.

34. The computer readable medium of claim 33, wherein said animation display logic further comprises:

logic configured for folding said first captured image substantially behind said second captured image; and logic configured for displaying a momentary icon representing a logical position of said first captured image in said group.

35. The computer readable medium of claim 33, wherein said metaphoric icon is a paper-clip.

36. A computer readable medium having a program for manipulating information stored as a plurality of data entities in a memory, said program comprising:

logic configured for graphically associating a first data entity with a second data entity to form a group; and logic configured for graphically disassociating a data entity from a previously formed group.

* * * * *